(12) United States Patent
Fattal

(10) Patent No.: US 10,802,443 B2
(45) Date of Patent: *Oct. 13, 2020

(54) ANGULAR SUBPIXEL RENDERING MULTIVIEW DISPLAY USING SHIFTED MULTIBEAM DIFFRACTION GRATINGS

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 15/911,129

(22) Filed: Mar. 4, 2018

(65) Prior Publication Data

US 2018/0188691 A1 Jul. 5, 2018

Related U.S. Application Data

(63) Continuation of application No. PCT/US2016/050334, filed on Sep. 5, 2016.

(Continued)

(51) Int. Cl.
*G02B 6/12* (2006.01)
*F21V 8/00* (2006.01)
(Continued)

(52) U.S. Cl.
CPC ........... *G03H 1/265* (2013.01); *G02B 5/1819* (2013.01); *G02B 5/1842* (2013.01);
(Continued)

(58) Field of Classification Search
CPC ...... G02B 6/12; G02B 6/0035; G02B 6/0038; G02B 6/0068; G02B 6/0091; G02B 27/22;
(Continued)

(56) References Cited

U.S. PATENT DOCUMENTS 9,063,382 B2 6/2015 Kim
9,201,270 B2 12/2015 Fattal et al.
(Continued)

FOREIGN PATENT DOCUMENTS

| JP | 2010243941 A | 10/2010 | |
|---|---|---|---|
| KR | 20130025767 A | 3/2013 | |
| WO | WO-2015016844 A1 * | 2/2015 | ....... G02F 1/133615 |

OTHER PUBLICATIONS

International Search Report (ISR), 3 pages, from KIPO (ISA/KR), dated Dec. 16, 2016, for counterpart parent PCT patent application No. PCT/US2016/050334.

(Continued)

*Primary Examiner* — Sath V Perungavoor
*Assistant Examiner* — Tyler B Edwards
(74) *Attorney, Agent, or Firm* — J. Michael Johnson

(57) ABSTRACT

Multiview displays include a backlight and a screen used to form a plurality of multiview pixels. Each multiview pixel includes a plurality of sets of light valves. The backlight includes a light source optically coupled to a plate light guide configured with a plurality of multibeam diffraction gratings. Each multibeam diffraction grating corresponds to a set of light valves and is spatially offset with respect to a center of the set of light valves toward a center of the multiview pixel. The plurality of multibeam diffraction gratings is also configured to diffractively couple out light beams from the plate light guide with different diffraction angles and angular offsets such that at least a portion of the coupled-out light beams interleave and propagate in different view directions of the multiview display.

15 Claims, 13 Drawing Sheets

Related U.S. Application Data

(60) Provisional application No. 62/214,970, filed on Sep. 5, 2015.

(51) Int. Cl.

| | | |
|---|---|---|
| *G02B 27/42* | (2006.01) | |
| *G02F 1/1335* | (2006.01) | |
| *G09F 9/30* | (2006.01) | |
| *G03H 1/26* | (2006.01) | |
| *H04N 13/307* | (2018.01) | |
| *H04N 13/351* | (2018.01) | |
| *G02B 5/18* | (2006.01) | |
| *G02B 30/50* | (2020.01) | |
| *G03H 1/22* | (2006.01) | |

(52) U.S. Cl.
CPC ......... *G02B 6/0035* (2013.01); *G02B 6/0038* (2013.01); *G02B 6/0068* (2013.01); *G02B 6/0091* (2013.01); *G02B 6/12* (2013.01); *G02B 30/50* (2020.01); *G02F 1/133504* (2013.01); *G03H 1/2205* (2013.01); *H04N 13/307* (2018.05); *H04N 13/351* (2018.05); *G03H 2001/2207* (2013.01); *G03H 2001/2231* (2013.01); *G03H 2001/2234* (2013.01); *G03H 2001/2242* (2013.01); *G03H 2223/23* (2013.01)

(58) Field of Classification Search
CPC ...... G02B 27/42; G02B 30/50; G02B 5/1819; G02B 5/1842; G02B 6/0036; G02B 6/0058; G02B 6/006; G02F 1/133504; G02F 1/1335; G03H 1/2205; G03H 1/265; G03H 2001/2207; G03H 2001/2231; G03H 2001/2234; G03H 2001/2242; G03H 2223/23; H04N 13/307; H04N 13/351; G09F 19/12; G09F 9/30

See application file for complete search history.

(56) References Cited

U.S. PATENT DOCUMENTS

| | | | |
|---|---|---|---|
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 2002/0141056 | A1* | 10/2002 | Kobayashi ............. H04N 13/32 359/462 |
| 2008/0150936 | A1* | 6/2008 | Karman ............... H04N 13/376 345/419 |
| 2012/0038986 | A1 | 2/2012 | Pesach |
| 2015/0016777 | A1 | 1/2015 | Abovitz et al. |
| 2015/0036068 | A1 | 2/2015 | Fattal et al. |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

\* cited by examiner

US 10,802,443 B2

ANGULAR SUBPIXEL RENDERING MULTIVIEW DISPLAY USING SHIFTED MULTIBEAM DIFFRACTION GRATINGS

CROSS-REFERENCE TO RELATED APPLICATIONS

This application is a continuation patent application of and claims the benefit of priority to International Application No. PCT/US2016/050334, filed Sep. 5, 2016, which claims the benefit of priority to U.S. Provisional Patent Application Ser. No. 62/214,970, filed Sep. 5, 2015, the entire contents of which are incorporated herein by reference.

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

In order to overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

DESCRIPTION OF THE DRAWINGS

Various features of examples and embodiments in accordance with the principles described herein may be more readily understood with reference to the following detailed description taken in conjunction with examples illustrated in the accompanying drawings, where like reference numerals designate like structural elements, and in which.

Figure 1A:
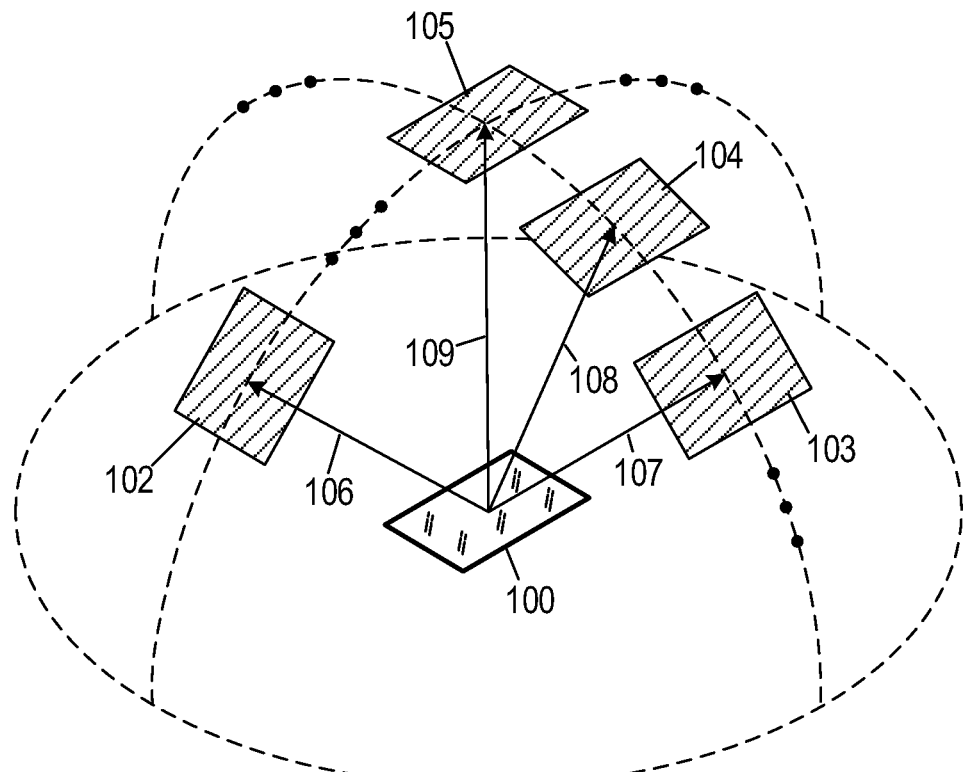
FIG. 1A illustrates a perspective view of a multiview image produced by an example multiview display.

Certain examples and embodiments may have other features that are one of in addition to and in lieu of the features illustrated in the above-referenced figures. These and other features are described below with reference to the above-referenced figures.

DETAILED DESCRIPTION

Examples and embodiments in accordance with the principles described herein provide angular sub pixel rendering in a multiview display using shifted multibeam diffraction gratings. As described herein, a multiview display is an electronic display or display system configured to provide a plurality or number of different views of a multiview image in different view directions. In particular, the term 'multiview' as used in the terms 'multiview image' refers to a plurality or a number of views representing different perspective views or including angular disparity between views of the many different views. In addition, the term 'multiview' includes more than two different views (i.e., a minimum of three views and generally more than three views). As such, a 'multiview display' is distinguished from a stereoscopic display, which only provides or displays two different views to represent a scene or an image. Note however, while multiview images and multiview displays include more than two views, multiview images may be viewed (e.g., on a multiview display) as a stereoscopic pair of images by selecting only two of the multiview views to view at a time (e.g., one view per eye).

According to various embodiments, a multiview display comprises a screen with a plurality of multiview pixels. Each multiview pixel comprises a plurality of sets of light valves. Further, the multiview display includes a backlight that comprises a light source optically coupled to a plate light guide that is configured with a plurality of multibeam diffraction gratings, according to various embodiments. Each multibeam diffraction grating corresponds to a set of light valves. In addition, each multibeam diffraction grating is spatially offset with respect to a center of each corresponding set of light valves toward a center of the multiview pixel. The sets of light valves modulate the light diffractively coupled out of the corresponding multibeam diffraction gratings. The spatial offset of the multibeam diffractions gratings creates an angular offset in modulated light beams emerging from the sets of light valves. The modulated light beams that emerge from the sets of light valves associated with each multiview pixel interleave to create multiview images at a viewing distance from the screen. According to various embodiments of the principles described herein, the multiview display having interleaved modulated light beams may provide a multiview image having a resolution that is perceived to be higher than a 'native' resolution of the multiview display, i.e., a resolution that is higher than a resolution of the multiview display without interleaved light beams. In particular, a perceived higher than native resolution is the result of angular subpixel rendering resulting from the interleaved modulated light beams provided by the multiview display, according to various embodiments.

Figure 9A:
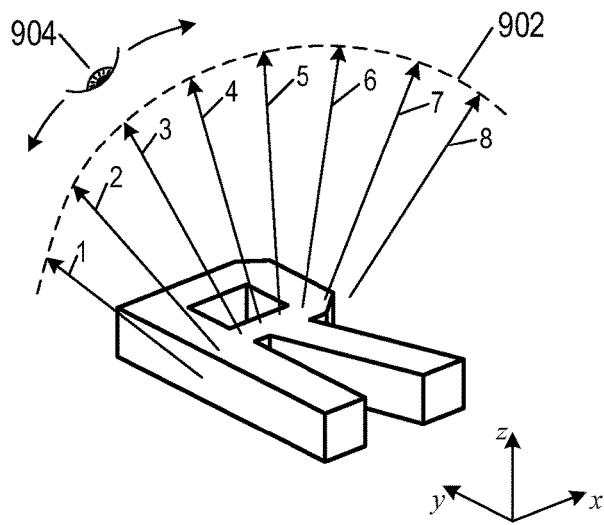
FIG. 9A illustrates the letter "R" as an example of a three-dimensional (3D) object.

FIG. 1A illustrates a perspective view of a multiview image produced by an example multiview display 100. As illustrated in FIG. 1A, the multiview display 100 may simultaneously display multiple images. Each image provides a different view of a scene or object from a different view direction or perspective. In FIG. 1A, the view directions are illustrated as arrows extending from the multiview display 100 in various different principal angular directions. The different views are illustrated as shaded polygonal panels at the termination of the arrows. For example, in FIG. 1A, four polygonal panels 102-105 represent four different views of a multiview image from different corresponding view directions 106-109. Suppose the multiview display 100 is used to display a multiview image of an object, e.g., a three-dimensional letter 'R', as illustrated below with respect to FIGS. 9A-9B. When an observer views the multiview display 100 in the direction 106, the observer sees the view 102 of the object. However, when the observer views the multiview display 100 from the view direction 109, the observer sees a different view 105 of the same object. Note that for simplicity of illustration the different views are illustrated in FIG. 1A as being above the multiview display 100. Note that, in practice, the different views are actually simultaneously displayed on a screen of the multiview display 100, enabling an observer to view an object or scene from different view directions by simply changing the observer's view direction of the multiview display 100.

A view direction or equivalently a light beam having a direction corresponding to a view direction of a multiview display generally has a principal angular direction given by angular components ($\alpha, \beta$). The angular component $\alpha$ is referred to as the 'elevation component' or 'elevation angle' of the light beam. The angular component $\beta$ is referred to as the 'azimuth component' or 'azimuth angle' of the light beam. The elevation angle $\alpha$ is an angle in a vertical plane (e.g., perpendicular to a plane of the screen of the multiview display) while the azimuth angle $\beta$ is an angle in a horizontal plane (e.g., parallel to the plane of the screen of the multiview display).

Figure 1B:
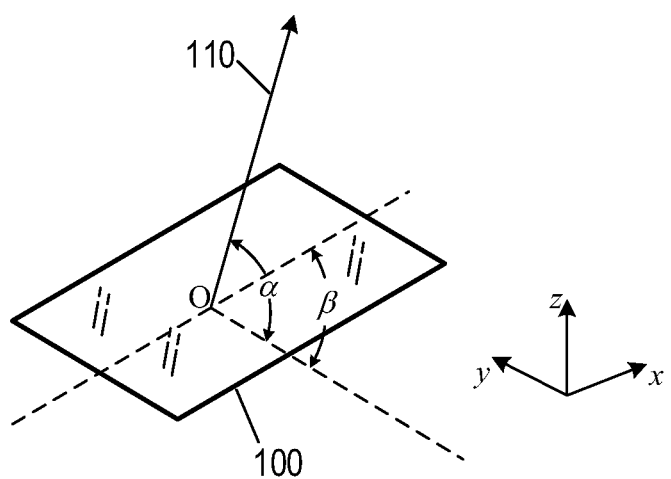
FIG. 1B illustrates a graphical representation of angular components of a light beam emanating from a point of a multiview display.

FIG. 1B illustrates a graphical representation of the angular components ($\alpha, \beta$) of a light beam 110 emitted or emanating from a point on the multiview display 100 with a particular principal angular direction corresponding to a view direction, such as the view direction 108 in FIG. 1A. The light beam 110 has a central ray associated with a particular point of origin "O" within the multiview display 100.

Figure 2A:
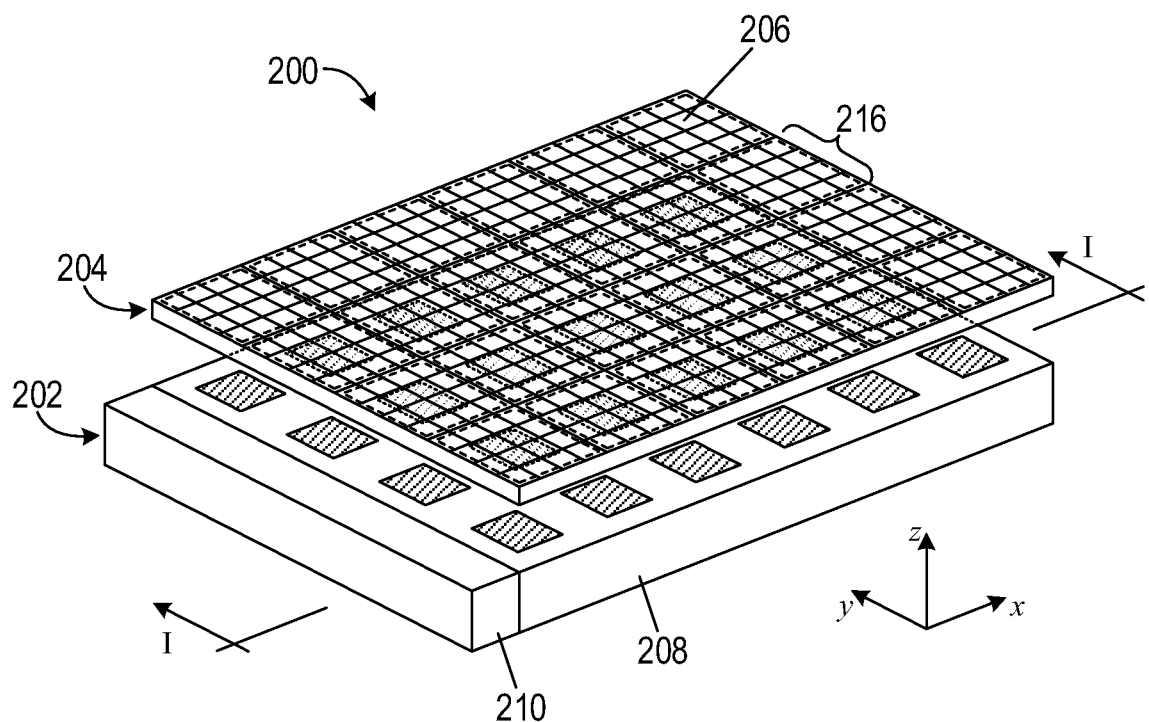
FIG. 2A illustrates an isometric view of an example multiview display.
Figure 2B:
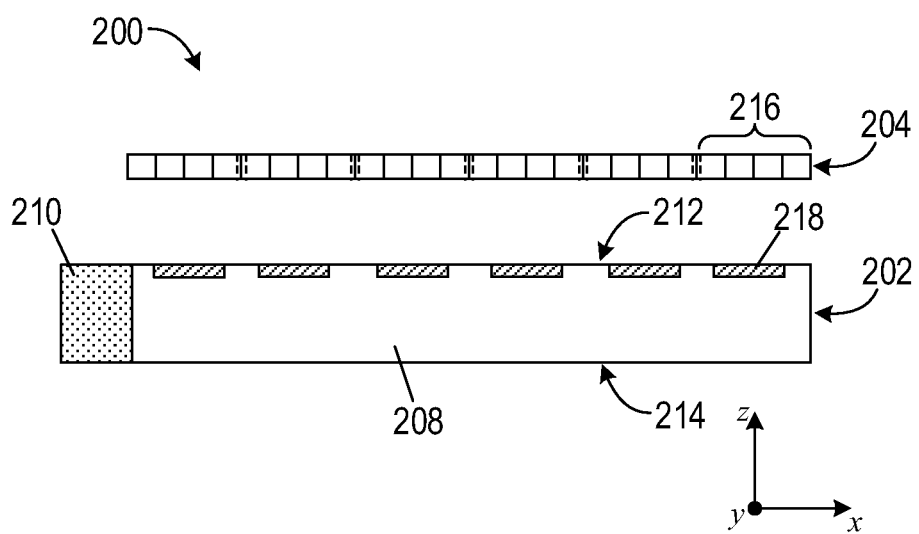
FIG. 2B illustrates a cross-sectional view of the multiview display illustrated in FIG. 2A along a line I-I.
Figure 2C:
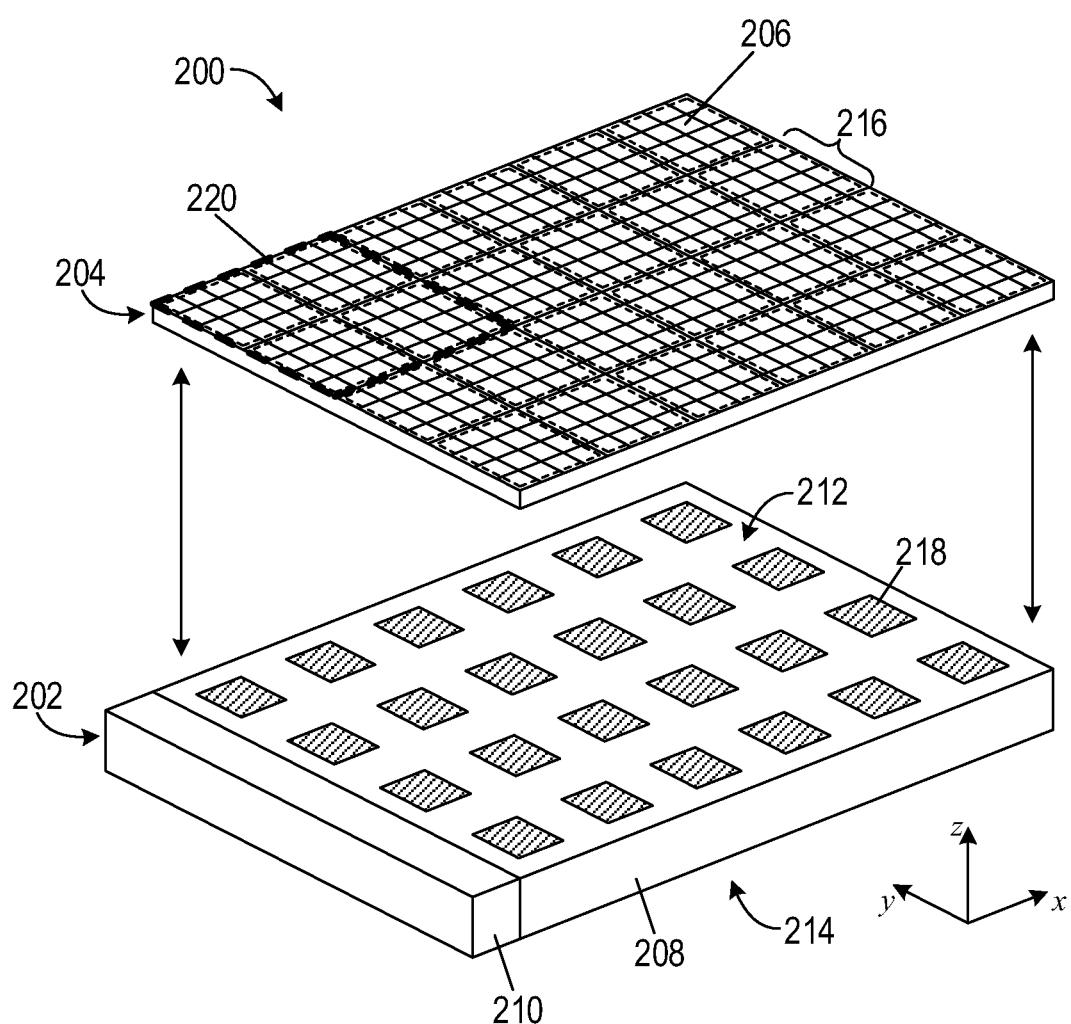
FIG. 2C illustrates an exploded isometric view of the multiview display illustrated in FIG. 2A.

FIG. 2A illustrates an isometric view of an example multiview display 200. FIG. 2B illustrates a cross-sectional view of the multiview display 200 along a line I-I in FIG. 2A. FIG. 2C illustrates an exploded isometric view of the multiview display 200. As illustrated in FIGS. 2A-2C, the multiview display 200 comprises a backlight 202 and a screen 204 that comprises an array of light valves. Light valves in the array of light valves are represented by squares. For example, a light valve is represented by square 206. The backlight 202 comprises a plate light guide 208 and a light source 210 optically coupled to an edge of the plate light guide 208. Light generated by the light source 210 is coupled into the plate light guide 208 along an edge of the plate light guide 208 adjacent to the light source 210.

The plate light guide 208 may be a plate or slab optical waveguide having substantially planar, parallel first and second surfaces 212 and 214, respectively. The plate light guide 208 may comprise any one of a number of different optically transparent materials or comprise any of a variety of dielectric materials including, but not limited to, one or more of various types of glass, such as silica glass, alkali-aluminosilicate glass, borosilicate glass, and substantially optically transparent plastics or polymers, such as poly (methyl methacrylate) or acrylic glass, and polycarbonate. In some embodiments, the plate light guide 208 may include a cladding layer on at least a portion of a surface of the plate light guide 208 (not illustrated) to facilitate total internal reflection (TIR).

The light source 210 may comprise one or more optical emitters. An optical emitter may be a light-emitting diode (LED), a laser, an organic light-emitting diode (OLED), a polymer light-emitting diode, a plasma-based optical emitter, a fluorescent lamp, an incandescent lamp, and any other source of light. The light produced by the light source 210 may be of a particular wavelength (i.e., may be of a particular color), or may be over or include a range of wavelengths (e.g., white light). In some embodiments, the light source 210 may include sets of optical emitters in which each set of optical emitters produces light of a particular wavelength or a range of wavelengths that is different from the wavelength or range of wavelengths produced by the other sets of optical emitters. For example, the light source 210 may comprise sets of optical emitters in which each set of one or more optical emitters produces one of the primary colors (e.g., red, green, and blue).

As illustrated in FIGS. 2A-2C, the array of light valves are partitioned into sets of light valves demarcated by dashed-line squares. In the example of FIGS. 2A-2C, each set of light valves comprises a four-by-four sub-array of sixteen light valves. For example, a set of light valves 216 comprises a four-by-four array of light valves demarcated by a dashed-line square. Each set of light valves corresponds to a multibeam diffraction grating 218 of the plate light guide 208. In the example of FIGS. 2A-2C, the multibeam diffraction gratings 218 are represented by shaded patches on the first surface 212 of the plate light guide 208.

Note that although examples and embodiments of multi-view displays are illustrated and described herein with reference to sets of light valves comprising four-by-four sub-arrays of light valves (i.e., sub-array of sixteen light valves), as illustrated in FIGS. 2A-2C, the number of light valves used to form sets of light valves may by N-by-N sub-arrays of light valves, where N is an integer greater than or equal to two. Sets of light valves may also be rectangular N-by-M sub-arrays of light valves, where N is an integer greater than or equal to two and M is an integer greater than or equal to zero.

Sets of light valves may be grouped to form multiview pixels of an array of multiview pixels. A 'multiview pixel' is a plurality of sets of light valves representing 'view' pixels in each of a similar plurality of different views of a multi-view display. In particular, a multiview pixel may have a set of light valves corresponding to or representing a view pixel in each of the different views of a multiview image. Moreover, the sets of light valves of the multiview pixel are so-called 'directional pixels' in that each of the sets of light valves is associated with a predetermined view direction of a corresponding one of the different views. Further, according to various examples and embodiments, the different view pixels represented by the sets of light valves of a multiview pixel may have equivalent or at least substantially similar locations or coordinates in each of the different views. For example, the twenty-four sets of light valves of the screen 204 illustrated in FIGS. 2A and 2C may be grouped to form an array of six multiview pixels, each multiview pixel comprising a two-by-two array of four sets of light valves. In FIG. 2C, an example multiview pixel comprising a two-by-two array of four sets of light valves is outlined by dashed-line square 220. In certain embodiments, multiview pixels of an array of multiview pixels may be formed from three-by-three arrays of nine sets of light valves, four-by-four arrays of sixteen sets of light valves, and five-by-five arrays of twenty-five sets of light valves. In other embodiments, the multiview pixels of an array of multiview pixels may be formed from rectangular arrays of sets of light valves. In general, multiview pixels of an array of multiview pixels may be formed from K-by-L arrays of K×L sets of light valves, where K is an integer greater than or equal to 2 and L is an integer greater than or equal to one.

Figure 3:
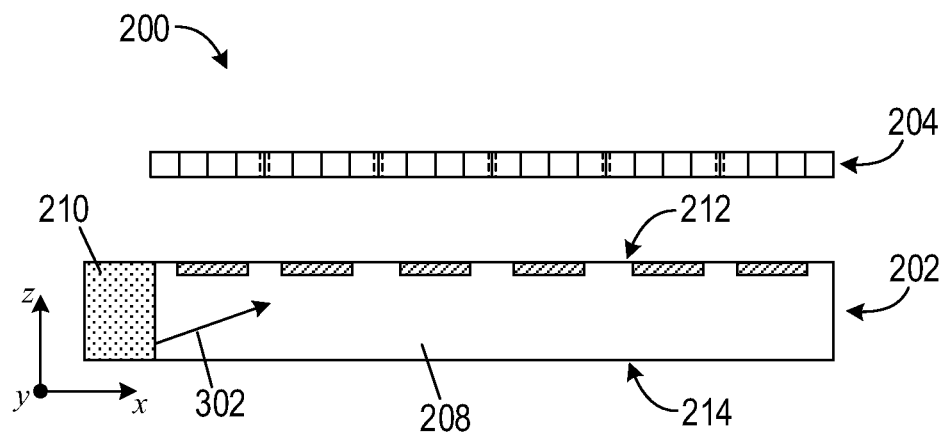
FIG. 3 illustrates a cross-sectional view of the multiview display illustrated in FIG. 2B with light coupled into a plate light guide of the multiview display.

FIG. 3 illustrates a cross-sectional view of the multiview display 200 in which light 302 produced by the light source 210 is input to, or coupled into, the plate light guide 208. The light 302 is coupled into the plate light guide 208 at a non-zero propagation angle (e.g., about 30-35 degrees) with respect to the first and second surfaces 212 and 214 of the plate light guide 208. The multiview display 200 may include one or more lenses, mirrors or similar reflectors (e.g., a tilted collimating reflector), and one or more prisms (not illustrated) may be used to couple light produced by the light source 210 into the plate light guide 208 at the non-zero propagation angle. The light 302 may be input to the plate light guide 208 as collimated light.

Figure 4:
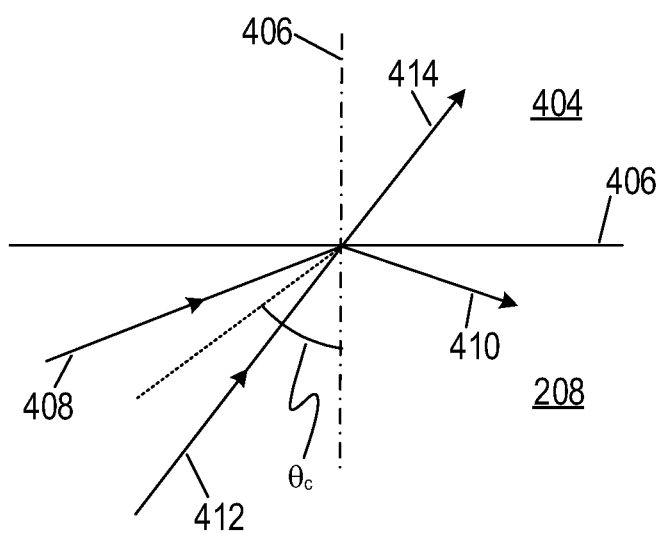
FIG. 4 illustrates an example of total internal reflection.

The plate light guide 208 guides the light 302 according to TIR at the non-zero propagation angle between the first surface 212 and the second surface 214 of the plate light guide 208. FIG. 4 illustrates trajectories of two beams of light that may propagate within the plate light guide 208 and are incident on the same point of a surface 402 (e.g., the surface 402 may be the first surface 212 or the second surface 214) of the plate light guide 208. As illustrated, the surface 402 is a boundary between the plate light guide 208 and air 404, which has a lower refractive index than the plate light guide 208. Dot-dashed line 406 represents a normal direction to the surface 402 and $\theta_c$ denotes a critical angle with respect to the normal direction. The angle of incidence is measured with respect to the normal direction. The light incident on the surface 402 at angles greater than the critical angle $\theta_c$ experiences TIR. For example, because the light represented by directional arrow 408 is incident on the surface 402 at an angle greater than the critical angle $\theta_c$, the light is internally reflected as represented by directional arrow 410. Light incident on the surface 402 at an angle less than the critical angle $\theta_c$, as represented by directional arrow 412, is transmitted as represented by directional arrow 414.

Each multibeam diffraction grating 218 comprises a plurality of diffractive features configured to diffract incident light. In some examples, the plurality of diffractive features may be arranged in a periodic or quasi-periodic manner. For example, the multibeam diffraction gratings may include a plurality of diffractive features (e.g., a plurality of grooves or ridges in a material surface) arranged in a one-dimensional (1D) array. In other examples, the multibeam diffraction gratings may be a two-dimensional (2D) array of diffractive features. The multibeam diffraction gratings 218 may be a 2D array of bumps on, or holes in, a material surface of the plate light guide 208. The multibeam diffraction gratings 218 may be formed using any one of many different microfabrication techniques, including, but not limited to, wet etching, ion milling, photolithography, anisotropic etching, and plasma etching.

According to some embodiments, the multibeam diffraction gratings 218 may be a chirped or non-uniform diffraction grating. The diffractive feature spacing of a chirped multibeam diffraction grating varies across an extent or length of the chirped multibeam diffraction grating. In some embodiments, a chirped multibeam diffraction grating may have a chirp of the diffractive feature spacing that varies linearly with distance. As such, the chirped multibeam diffraction grating is a 'linearly chirped' multibeam diffraction grating, by definition herein. In other embodiments, a chirped multibeam diffraction grating may have a chirp of the diffractive feature spacing that varies non-linearly with distance. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle chirp or sawtooth chirp, may also be employed. The multibeam diffraction grating 218 may also be a combination of any one or more linear and/or non-linear chirped gratings that diffractively coupled-out light with different diffraction angles.

Light incident on a multibeam diffraction grating 218 is diffracted. When light is incident on the multibeam diffraction grating 218 from within the plate light guide 208, the multibeam diffraction grating 218 provides transmitted diffraction by diffractively coupling light out from the plate light guide 208 and is referred to as a 'transmission mode' multibeam diffraction grating. A multibeam diffraction grating also redirects or changes an angle of the light by diffraction (i.e., at a diffractive angle). In particular, diffraction causes the light coupled out of the multibeam diffraction grating 218 to propagate in different propagation directions from the propagation direction of the light incident on the multibeam diffraction grating (i.e., incident light). The change in the propagation direction of the light by diffraction is referred to as 'diffractive redirection.' As a result, the multibeam diffraction grating 218 may be understood to be a structure including diffractive features that diffractively redirects light incident on the multibeam diffraction grating 218 and, if the light propagating within the plate light guide 208 is incident on the multibeam diffraction grating, the multibeam diffraction grating may also diffractively couple light out from the plate light guide 208. The form of the light diffractively scattered out from the plate light guide 208 by the multibeam diffraction grating depends on the structure and configuration of the diffractive features.

Figure 5A:
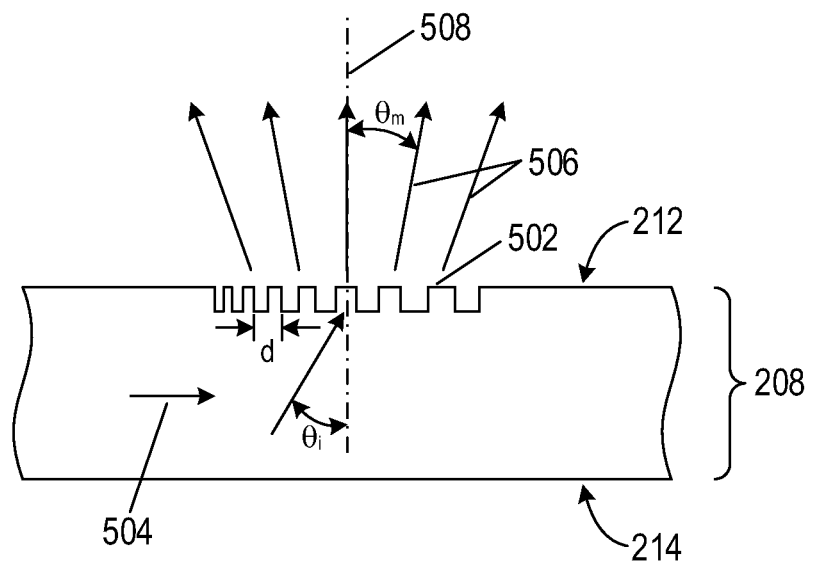
FIGS. 5A-5B illustrate cross-sectional views of examples of chirped transmission mode multibeam diffraction gratings.
Figure 5B:
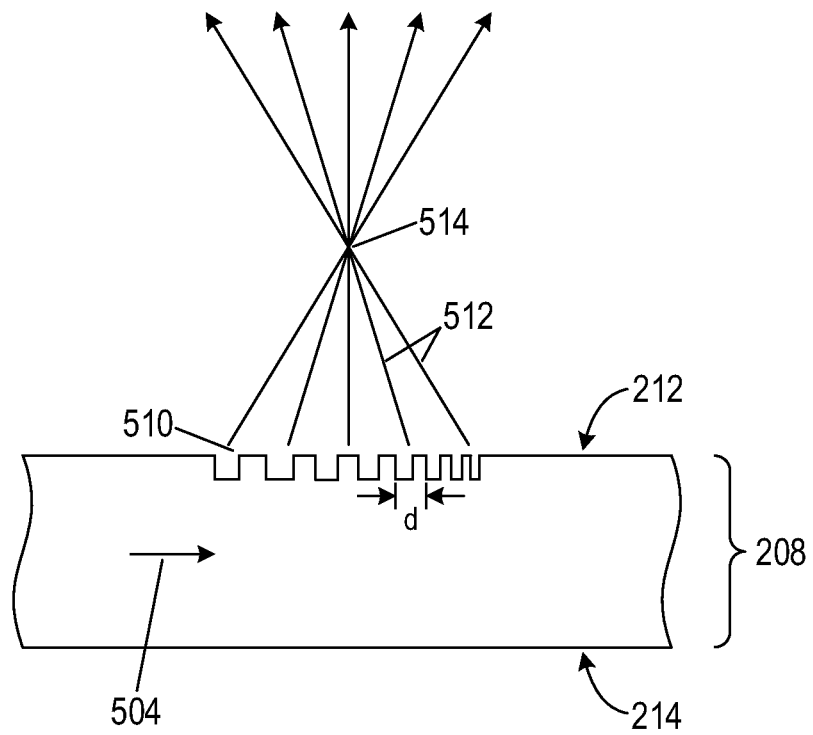

FIGS. 5A-5B illustrate cross-sectional views of examples of chirped transmission mode multibeam diffraction gratings formed in the first surface 212 of the plate light guide 208. In FIG. 5A, the diffractive feature spacing, d, of a multibeam diffraction grating 502 varies with respect to distance in the x-direction. In this example, when light propagates in the general direction 504 of increasing feature spacing d diffractively coupled-out light represented by the directional arrows 506 emerges from the multibeam diffraction grating 502 with divergent diffraction angles (i.e., the light spreads out). Light incident on the multibeam diffraction gratings 502 is diffractively transmitted or diffractively coupled out of the plate light guide 208 through the multibeam diffraction grating 502.

Consider light of a particular wavelength $\lambda$ interacting with the multibeam diffraction grating 502. As the light emerges from the multibeam diffraction grating 502, the light is transmitted and scattered in different directions by the diffractive features, but because waves of light emerge from the multibeam diffraction grating 502 with different phases, the waves constructively and destructively interfere, creating light beams where the waves constructively interfere. For example, when the path difference between the waves emerging from adjacent diffractive features is half the wavelength (i.e., $\lambda/2$), the waves emerge out of phase and may be cancelled through destructive interference. On the other hand, when the path difference between the waves emerging from adjacent diffractive features equals the wavelength $\lambda$, the waves constructively interfere creating emerging light beams with maximum intensity. The light that emerges with maximum intensity from the multibeam diffraction grating 502 are represented in FIG. 5A by directional arrows 506 and the diffraction angles at which each beam of light emerges from the multibeam diffraction grating 502 with respect to a normal direction (i.e., represented by dot-dashed line 508) to the first surface 212 may be calculated according to the diffraction equation:

$$\theta_m = \sin^{-1}\left(n\sin\theta_i - \frac{m\lambda}{d}\right) \quad (1)$$

where m is the diffraction order (i.e., m= ..., −2, −1, 0, 1, 2, ...);

n is the refractive index of the plate light guide 208;

$\theta_i$ is the angle of incidence of light with respect to the normal direction; and $\theta_m$ is the diffraction angle with respect to the normal direction of the m-th beam of light diffractively coupled out from the plate light guide 208.

In FIG. 5B, the diffractive feature spacing, d, of a multibeam diffraction grating 510 also varies in the x-direction. In this example, when light incident on the multibeam diffraction grating 510 propagates in the direction 504 of decreasing feature spacing d, diffractively coupled-out light 512 converges in a convergent region 514 and diverges beyond the convergent region 514.

Figure 6A:
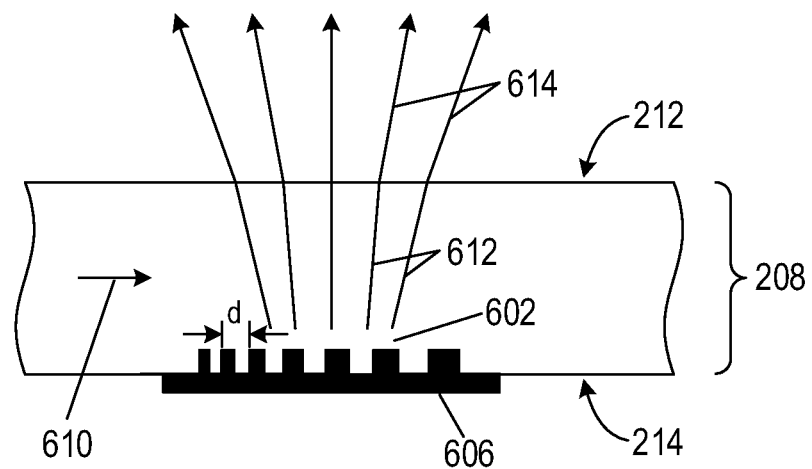
FIGS. 6A-6B illustrate cross-sectional views of examples of chirped reflection mode multibeam diffraction gratings.
Figure 6B:
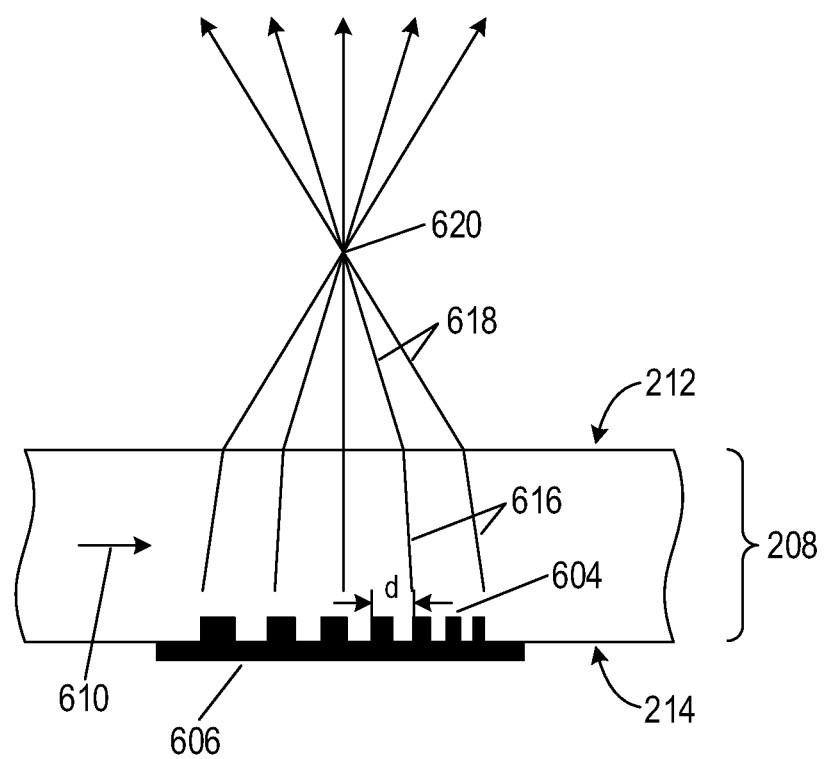

FIGS. 6A-6B illustrate cross-sectional views of examples of chirped reflection mode multibeam diffraction gratings formed in the second surface 214 of the plate light guide 208. The multibeam diffraction gratings 602 and 604 are chirped diffraction grating patterns formed in the second surface 214 of the plate light guide 208 and have corresponding reflective material 606, such as, but not limited to, silver or aluminum, deposited in the grooves and recesses of the multibeam diffraction gratings 602 and 604. In FIG. 6A, the diffractive feature spacing, d, of the multibeam diffraction grating 602 varies in the x-direction. In this example, when light propagates in the direction 610 of increasing feature spacing d, diffracted light 612 is created with divergent diffraction angles and the reflective material 606 reflects the diffracted light 612 toward the first surface 212. The light 614 that emerges from the plate light guide 208 along the first surface 212 is refracted due to the difference between the refractive index of the plate light guide 208 and surrounding air. The diffractive features (e.g., diffractive feature spacing d) may be configured to account for refraction. In FIG. 6B, the diffractive feature spacing, d, of a multibeam diffraction grating 604 also varies in the x-direction. In this example, when the light propagates in the direction 610 of decreasing feature spacing d, diffracted light 616 is created and the reflective material 608 reflects the light 616 toward the first surface 212. The light 618 that emerges from the plate light guide 208 along the first surface 212 is refracted and converges in a convergent region 620 and diverges beyond the convergent region 620.

As described above with reference to FIG. 2C, an array of multiview pixels may be formed from arrays of sets of light valves. The multibeam diffraction grating associated with each set of light valves of a multiview pixel may be spatially offset toward a center of the multiview pixel, according to various embodiments.

Figure 7:
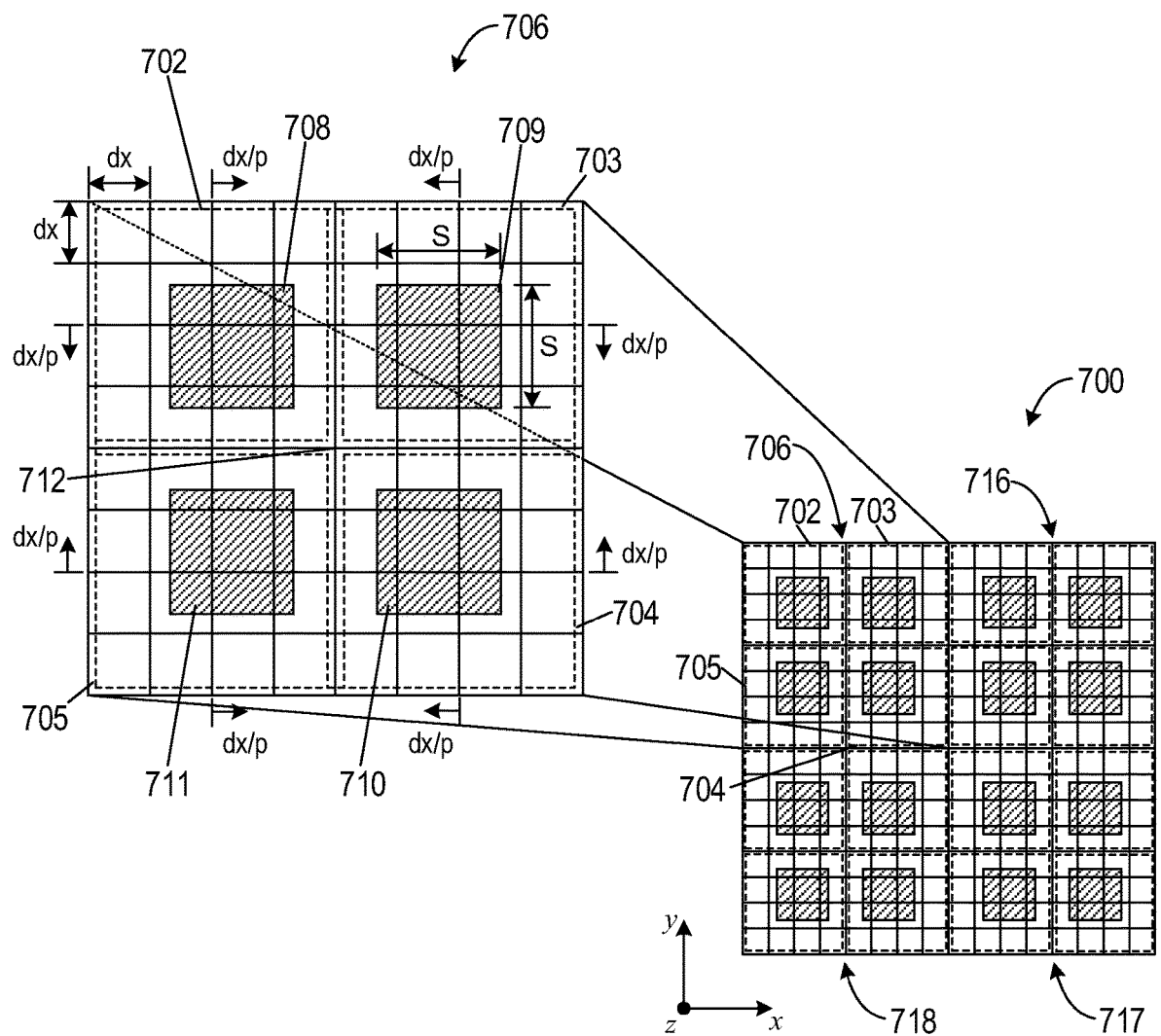
FIG. 7 illustrates a plan view of sets of light valves and corresponding spatially offset multibeam diffraction gratings of a multiview display.

FIG. 7 illustrates a plan view of sixteen example sets of light valves and corresponding multibeam diffraction gratings of a multiview display 700. As illustrated, each set of light valves in the multiview display 700 comprises a four-by-four array of light valves and is demarcated by a dashed-line square. For example, a set of light valves 702 comprises a four-by-four array of light valves. In FIG. 7, the sixteen example sets of light valves are grouped to form four multiview pixels, each multiview pixel comprising a two-by-two array of four sets of light valves. For example, four sets of light valves 702-705 are grouped to form a multiview pixel 706. FIG. 7 includes a magnified view of the multiview pixel 706 formed from the four sets of light valves 702-705. The magnified view of the multiview pixel 706 reveals that the four multibeam diffraction gratings 708-711 associated with corresponding sets of light valves 702-705 are spatially offset toward a center 712 of the multiview pixel 706.

In the example of FIG. 7, each multibeam diffraction grating is spatially offset toward the center of the multiview pixel in the x- and y-directions by a distance dx/p, where dx is the length of a light valve and p is a number greater than one. In other embodiments, the distance of the spatial offset of a diffraction multibeam element from the center of a corresponding set of light valves may be in only one of the x- and y-directions. The distance of the spatial offset may be any suitable fraction of the length dx of the light valves. For example, the distance of the spatial offset may be any integer fraction of the length of the light valves, such as, but not limited to, dx/2, dx/3, dx/4, dx/5, and dx/6. The plan view of the multiview display 700 also reveals that the four multibeam diffraction gratings that correspond to the four sets of light valves of three other multiview pixels 716-718 are also spatially offset toward the centers of the three multiview pixels 716-718. Each of the four-by-four sets of lights valves, such as sets of light valves 702-706, creates sixteen different views. As a result, each of the multiview pixels 706, 716-718 creates 64 views with a resolution of approximately 4×dx.

According to some embodiments, the size of each multibeam diffraction grating 218 is greater than the size of the light valves of the screen 204. The size may be a length, width, or area, for example. As illustrated in FIG. 7, the size of each multibeam diffraction grating is larger than the size of the light valves. In FIG. 7, the size of a multibeam diffraction grating may be given by the length, S, of a side of the multibeam diffraction grating or by the area, S×S, of the multibeam diffraction grating. On the other hand, the size of a light valve may be given by the length, dx, of a side of the light valve or by the area, dx×dx, of the light valve. The length S, or area S×S, of each multibeam diffraction grating is greater than the length dx, or area dx×dx, of each of the light valves. The size of a multibeam diffraction grating may be a multiple of the size of a light valve. For example, in FIG. 7, lengths S of the multibeam diffraction gratings are approximately 2dx (i.e., S=2dx). In general, the length S of a multibeam diffraction grating may be given by S=p×dx, where p is a number greater than one.

Figure 8A:
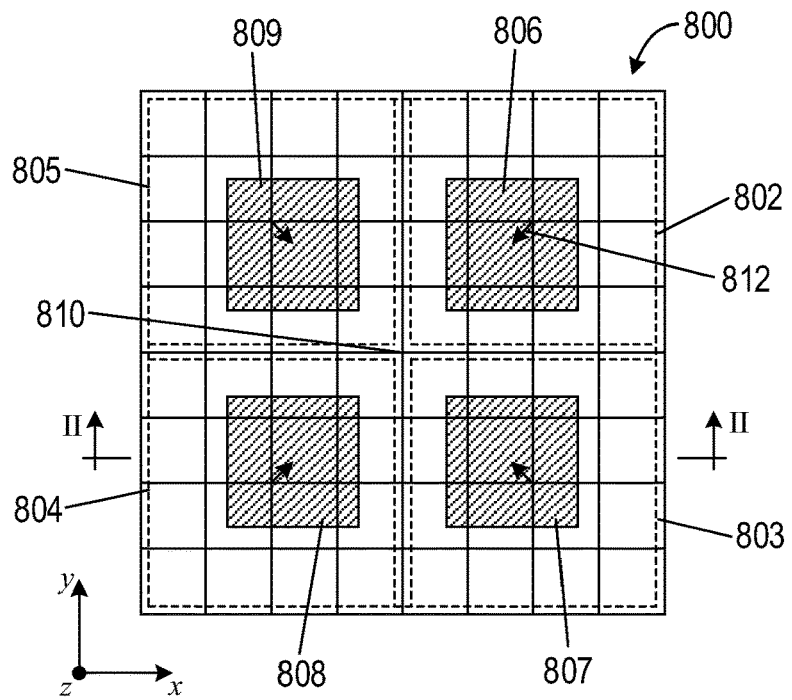
FIG. 8A illustrates a plan view of an example multiview pixel comprising four sets of light valves and corresponding spatially offset multibeam diffraction gratings.
Figure 8B:
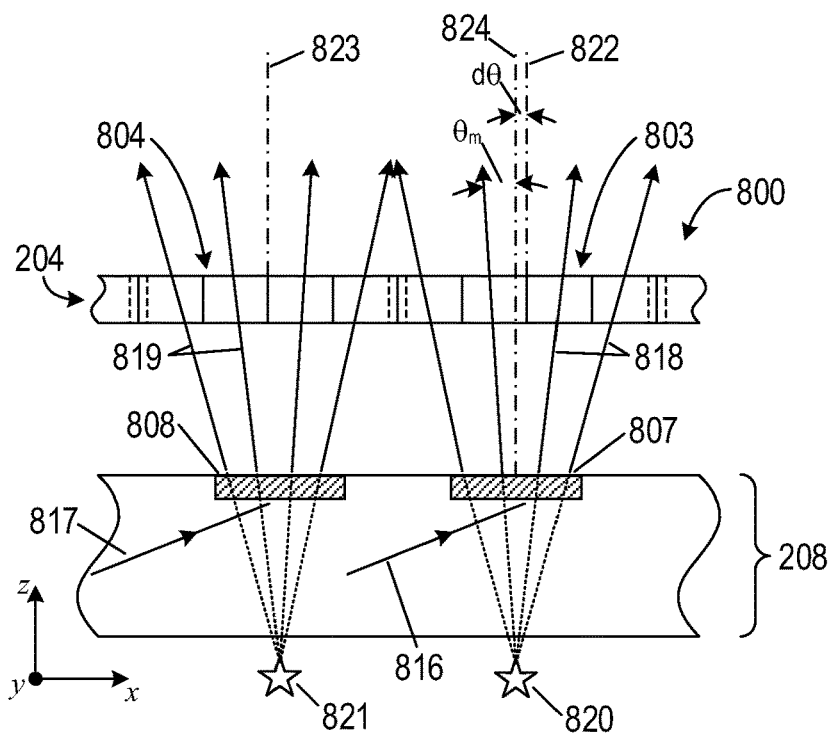
FIG. 8B illustrates a cross-sectional view of the multiview pixel illustrated in FIG. 8A along a line II-II.

The spatial offsets of the multibeam diffraction gratings with respect to the corresponding sets of light valves of a multiview pixel diffractively couple out light of the plate light guide with different diffraction angles and an angular offset (or tilt). FIG. 8A illustrates a plan view of an example multiview pixel 800 comprising four sets of light valves 802-805 identified by dashed-line squares and four corresponding multibeam diffraction gratings 806-809. FIG. 8B illustrates a cross-sectional view of the multiview pixel 800 along a line II-II illustrated in FIG. 8A. In FIG. 8A, the multibeam diffraction gratings 806-809 comprise chirped diffraction gratings, as described above with reference to FIGS. 5-6, that are configured to diffractively couple out light from the plate light guide 208 with different diffraction angles and are spatially offset toward a center 810 of the multibeam pixel 800 as indicated by directional arrows, such as directional arrow 812. In FIG. 8B, light 302 propagating in the plate light guide 208 is incident on the multibeam diffraction gratings 807 and 808 as represented by directional arrows 816 and 817. The multibeam diffraction gratings 807 and 808 are configured to diffractively couple out light with different diffraction angles as described above with reference to FIGS. 5-6. Directional arrows 818 represent paths of diffractively coupled-out light from the multibeam diffraction grating 807. The diffractively coupled-out light represented by the directional arrows 818 passes through light valves of the set of light valves 803. Directional arrows 819 represent paths of diffractively coupled-out light from the multibeam diffraction grating 808. The diffractively coupled-out light represented by the directional arrows 819 passes through light valves of the set of light valves 804. The diffractively coupled-out light that passes through sets of light valves appears to have been generated by separate virtual light sources, such as virtual light sources 820 and 821. The spatial offset of the multibeam diffraction gratings (or equivalently of the virtual light sources) creates an angular offset, dθ, with respect to a normal direction to the screen 204 located at the center of each set of light valves. In general, the angular offset, dθ, applies substantially equally to all of the light beams associated with a particular set of light valves. For example, in FIG. 8B, dot-dashed lines 822 and 823 represent normal directions to the screen 204 at the centers of the sets of light valves 803 and 804, respectively. Dot-dashed line 824 represents a normal direction to a center of the multibeam diffraction grating 807. Light is coupled out of the multibeam diffraction grating 807 with diffraction angles $\theta_m$ with respect to the normal direction and includes the angular offset dθ with respect to the normal direction represented by the dot-dashed line 822 of the set of light valves 803.

As illustrated in FIG. 8B, the light diffractively coupled out from a multibeam diffraction grating passes through light valves of a corresponding set of light valves. Modulated light beams that emerge from sets of light valves of a multiview pixel interleave at distances beyond the screen 204. The light valves of the sets of light valves may be modulated to create different views of a multiview image described above with reference to FIG. 1A and described below with reference to FIGS. 9-12.

FIGS. 9-12 illustrate projecting different views of a multiview image using sets of light valves of a multiview pixel. FIG. 9A illustrates the letter "R" as an example of a three-dimensional (3D) object to be projected in different views of a multiview image. The letter R lies in the xy-plane and protrudes in the z-direction. Directional arrows labeled corresponding to the images 1-8 represent eight different view directions of the 3D letter R along a curve 902 that lies in the xz-plane. FIG. 9B illustrates a series of eight different two-dimensional (2D) images of the 3D letter "R" labeled 1-8. Each 2D image displays one of the eight different views of the letter R illustrated in FIG. 9A. The images 1-8 of FIG. 9B represent discrete views an observer would see of the letter R as the observer's eye 904 looks at the 3D letter R in the corresponding view directions along the curve 902. In other words, the images 1-8 form a multiview image of the 2D letter R along the curve 902. For example, the 2D image 3 of FIG. 9B displays a view of the letter R in the view direction of the image 3 in FIG. 9A. The series of images 1-8 are consecutive or arranged in spatial succession that corresponds to the view directions of the images 1-8 of FIG. 9A. For example, a change in an observer's attention from the image 3 to either the image 2 or the image 4 in FIG. 9B is equivalent to a change in the view direction corresponding to the image 3 to either the view direction of the images 2 or 4 in FIG. 9A.

Figure 9B:
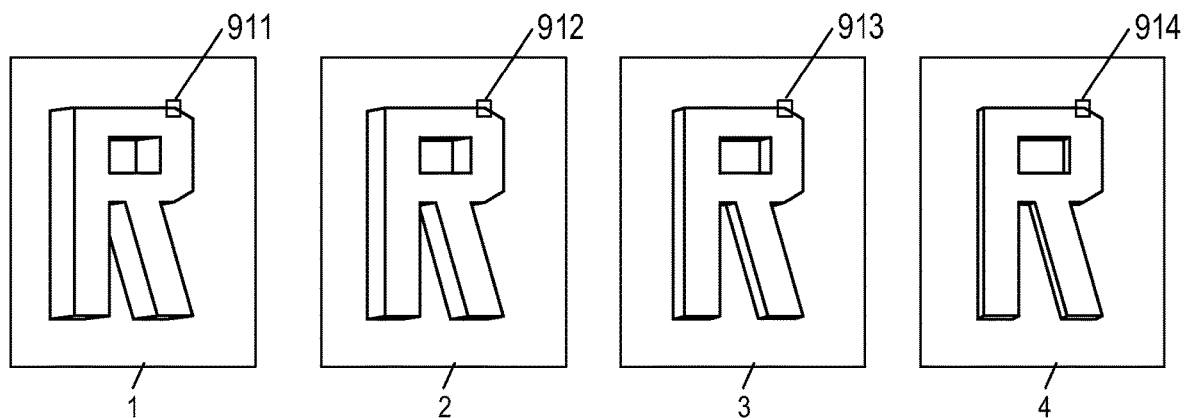
FIG. 9B illustrates a series of two-dimensional (2D) images of the 3D letter "R" illustrated in FIG. 9A.
Figure 9B:
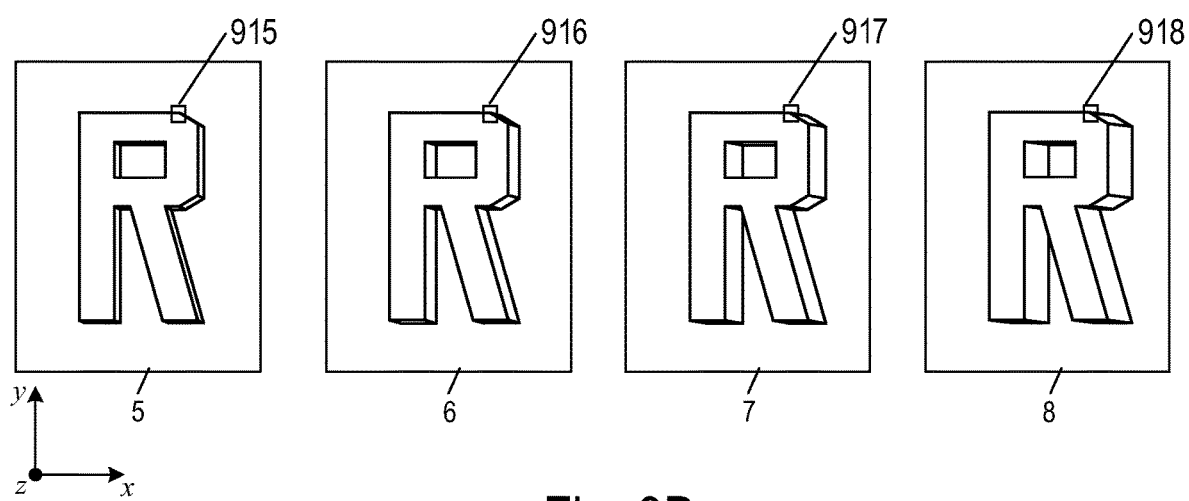
Figure 10:
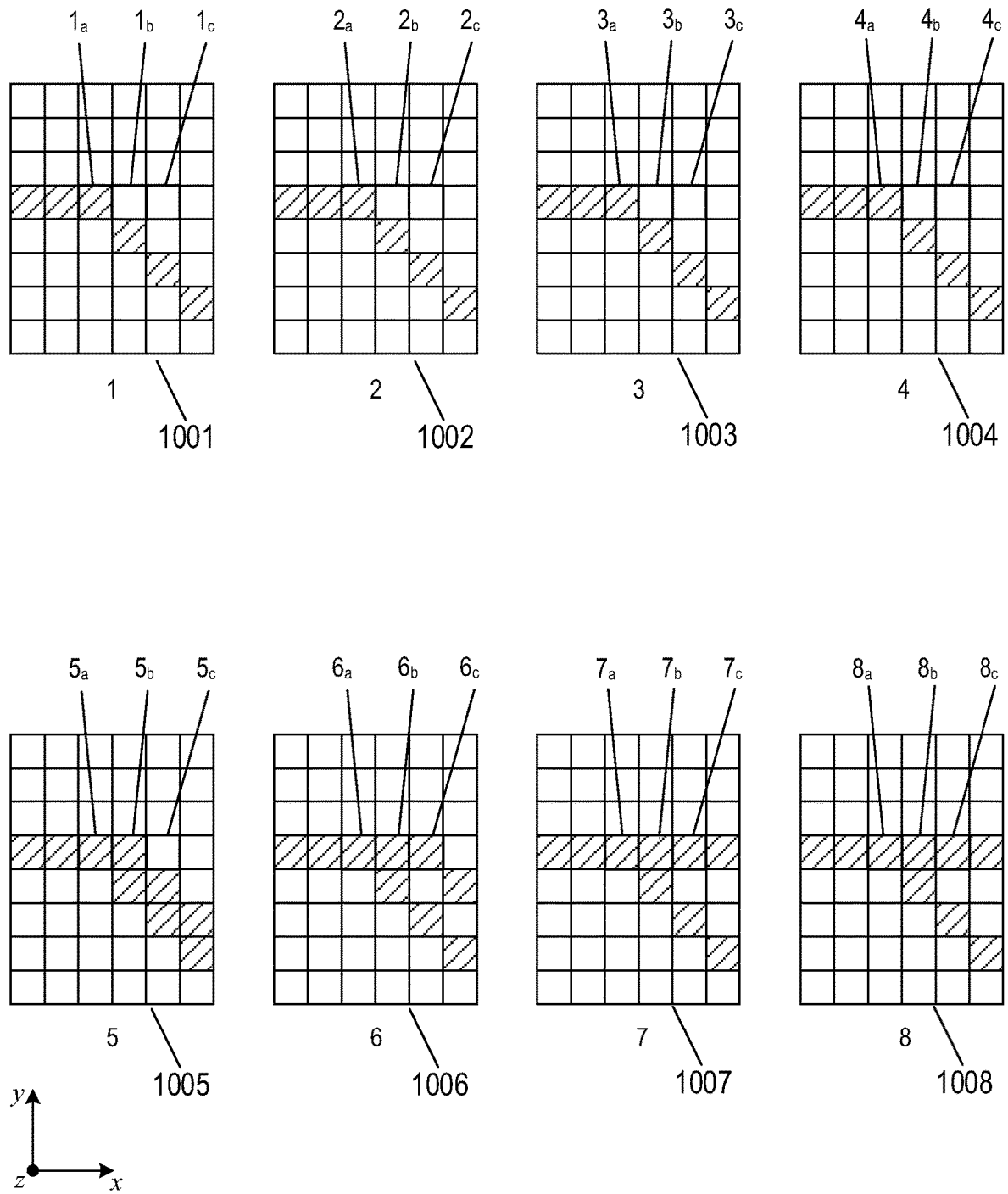
FIG. 10 illustrates magnified views of example sets of pixels that correspond to regions of eight different 2D images in FIG. 9B.

Each of the 2D images illustrated in FIG. 9B comprises a set of pixels. Each pixel has an intensity and a corresponding address or coordinate location in an image (e.g., a pixel equals (x, y, pixel intensity)). FIG. 10 illustrates magnified views of eight example sets of pixels 1001-1008 that correspond to regions 911-918 of the images 1-8 of FIG. 9B. For example, the set of pixels 1001 of FIG. 10 is a magnified view of the pixels in the region 911 of image 1 in FIG. 9B. In FIG. 10, the sets of pixels 1001-1008 have the same addresses or coordinate locations in the corresponding images 1-8 of FIG. 9B. For example, a triplet of adjacent pixels labeled 1a, 1b, and 1c in the set of pixels 1001 have the same coordinates (x, y) as the triplet of adjacent pixels labeled 5a, 5b, and 5c in the set of pixels 1005. For the sake of simplicity, in the example of FIG. 10, the intensities of the pixels are binary (i.e., black and white) with hash-marked pixels corresponding to the edges of the letter R in regions 911-918 of FIG. 9B. In other embodiments, pixels may be color pixels, such as red, green, and blue, and intensities may be modulated to control the amount light emitted from each pixel.

Figure 11:
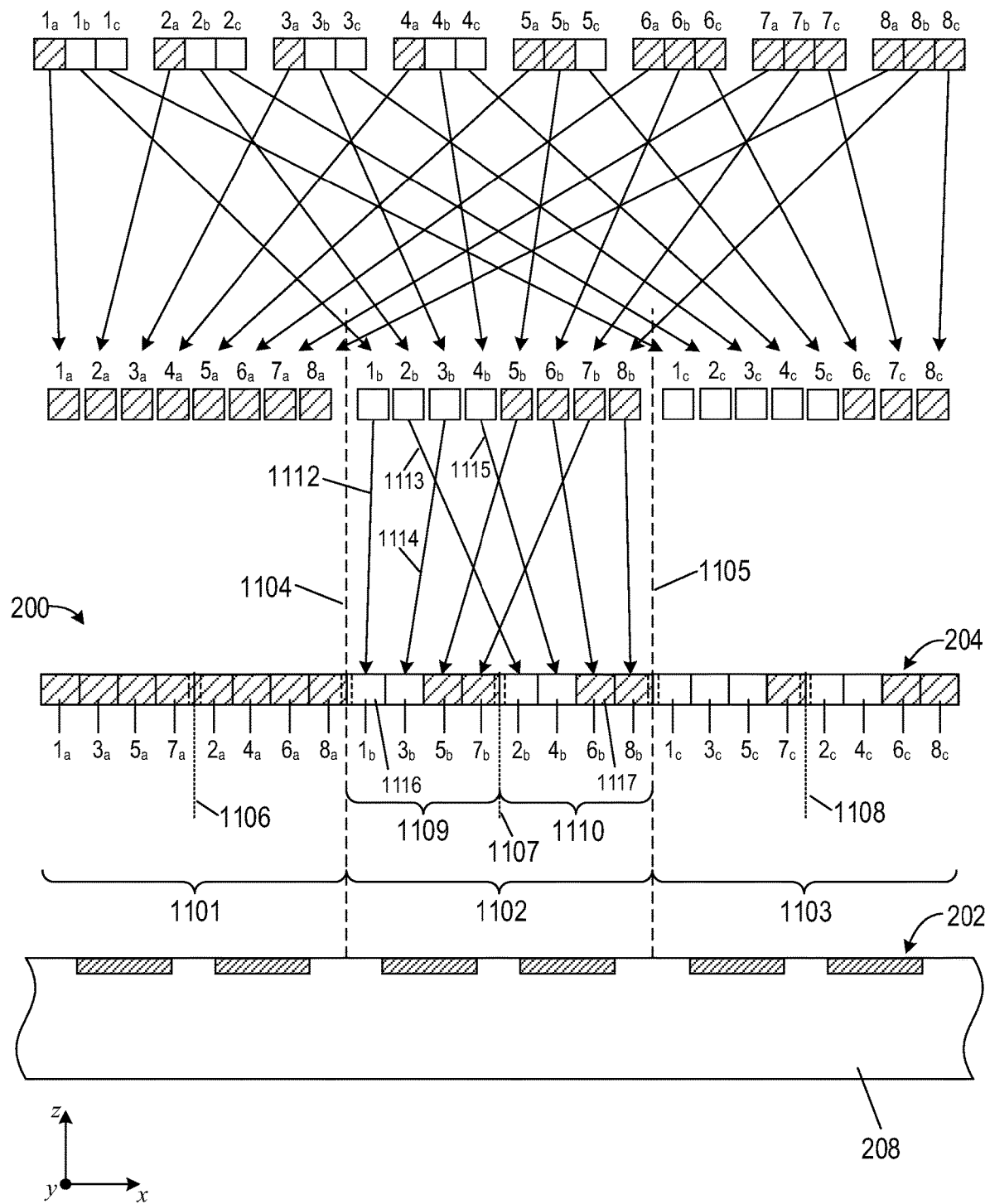
FIG. 11 illustrates a cross-sectional view of three adjacent multiview pixels of a multiview display.

FIG. 11 illustrates a cross-sectional view of three adjacent multiview pixels 1101-1103 of the multiview display 200 described above and assignment of pixel intensities of the 2D images to light valves of multiview pixels. Dashed lines 1104 and 1105 represent boundaries between the multiview pixels 1101-1103. Dotted lines 1106-1108 represent boundaries between sets of light valves that comprise the multiview pixels 1101-1103. For example, the multiview pixel 1101 comprises a set of light valves 1109 and a set of light valves 1110. FIG. 11 illustrates assignment of pixel intensities of triplets of adjacent pixels illustrated in FIG. 10 to a row of light valves of the sets of light valves of the multiview pixels 1101-1103. As illustrated in FIG. 11, pixels of the triplets of adjacent pixels with the same coordinates in the images 1-8 are assigned to the same multiview pixel image. For example, in FIG. 11, the pixels 1a, 2a, 3a, 4a, 5a, 6a, 7a, and 8a have the same coordinates in the images 1-8 of FIG. 10 and are assigned to the multiview pixel 1101. The pixels 1b, 2b, 3b, 4b, 5b, 6b, 7b, and 8b have the same coordinates in the images 1-8 and are assigned to the multiview pixel 1102. The pixels 1c, 2c, 3c, 4c, 5c, 6c, 7c, and 8c have the same coordinates in the images 1-8 and are assigned to the multiview pixel 1103. The intensity of pixels with the same coordinates in consecutive images are assigned in alternating order to the light valves of the sets of light valve of the multiview pixel. Directional arrows, such as directional arrows 1112-1115, represent an alternating order in which the intensities of the pixels assigned to the multiview pixel 1102 are assigned to the light valves of the two sets of light valves 1109 and 1110. For example, directional arrow 1112 represents assignment of the pixel intensity of the pixel 1b in image 1 to a first pixel in the set of light valves 1109. Directional arrow 1113 represents assignment of the pixel intensity the pixel 2b in image 2 (adjacent to image 1) to a first pixel in the set of light valves 1110. Directional arrow 1114 represents assignment of the pixel intensity of the pixel 3b in image 1 to a second pixel in the set of light valves 1109. Directional arrow 1115 represents assignment of the pixel intensity of the pixel 4b in image 2 to a second pixel in the set of light valves 1110. The intensity of a pixel in the images 1-8 may be assigned to a light valve of a set of light valves by modulating the intensity of the light valve to substantially match the intensity of the pixel. For example, the light valves 1116 and 1117 of the sets of light valves 1109 and 1110 are modulated to substantially match the intensity of the pixels 1b and 6b, respectively.

Light diffractively coupled out of a multibeam diffraction grating of the plate light guide propagates to a corresponding set of light valves. Light that is transmitted through a modulated light valve of a set of light valves creates a modulated light beam that propagates away from the screen 204 of the multiview display 200. Certain modulated light beams created by sets of light valves of a multiview pixel as described above with reference to FIG. 11 interleave away from the screen 204 thereby creating the directional pixels of images in a multiview image.

Figure 12:
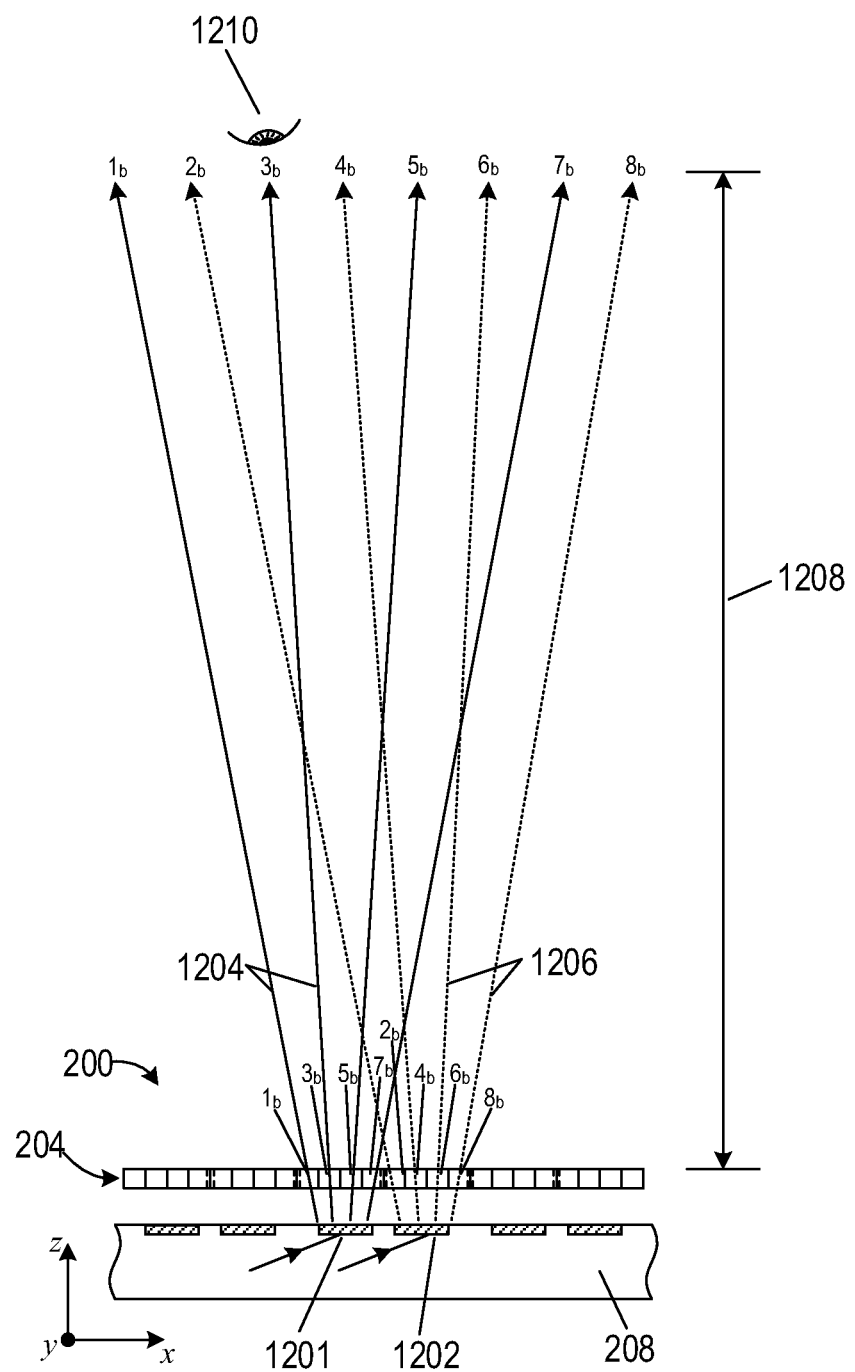
FIG. 12 illustrates directional pixels emanating from light valves of sets of light valves of a multiview pixel of a multiview display.

FIG. 12 illustrates directional pixels emanating from the light valves of the sets of light valves 1109 and 1110 of the multiview pixel 1102 of FIG. 11. Multibeam diffraction gratings 1201 and 1202 diffractively coupled-out light from corresponding sets of light valves 1109 and 1110 as described above with reference to FIGS. 8A-8B. Solid-line directional arrows 1204 represent diffractively coupled-out light that emerges as modulate light beams from the light valves of the set of light valves 1109 described above with reference to FIG. 11. Dashed-line directional arrows 1206 represent diffractively coupled-out light that emerges as modulate light beams from the light valves of the set of light valves 1110 described above with reference to FIG. 11. As illustrated in FIG. 12, directional pixels that correspond to the pixels 2b, 3b, 4b, 5b, 6b, and 7b interleave within or at a viewing distance 1208. The modulated light beams that correspond to pixels 1b and 8b may not interleave with the other modulated light beams output from the sets of light valves 1109 and 1110 within the view distance 1208. In other words, the modulate light beams that correspond to pixels of the first and last images in the series of images 1-8 may not interleave with the modulated light beams that correspond to the pixels of images in the series of images 2-7 within the viewing distance 1208. The interleaving of the modulate light beams output from the sets of light valves 1109 and 1110 reorders the pixels to match the order of the images 1-8 at about the viewing distance 1208. As an observer's eye 1210 moves across the screen 204 in the x-direction, the light from the modulated light beams enters the observer's eye with the same order as the series of images 1-8. When the other multiview pixels are operated in the same manner, the observer sees the images 1-8 in consecutive order as the observer's eyes moves across the screen 204 from the viewing distance 1208, recreating the multiview image experience described above with reference to FIG. 1A.

Figure 13:
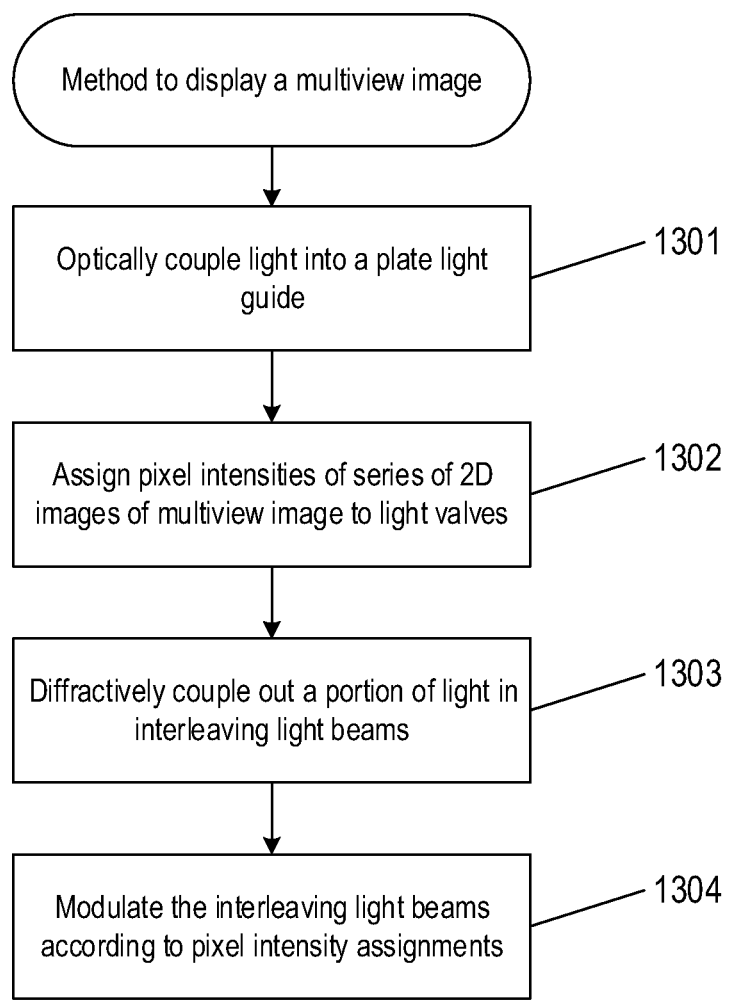
FIG. 13 illustrates a flow diagram of a method to display a multiview image.

FIG. 13 illustrates a flow diagram of a method to display a multiview image. In block 1301, light generated by a light source optically coupled to a plate light guide is optically coupled into the plate light guide as described above with reference to FIGS. 2 and 3. In block 1302, pixel intensities of a series of two-dimensional (2D) images of a multiview image are assigned to light valves of a plurality of sets of light valves of a multiview pixel as described above with reference to FIGS. 10 and 11. In block 1303, a portion of the light propagating in the plate light guide is diffractively coupled-out from a plurality of multibeam diffraction gratings of the plate light guide as described above with reference to FIG. 6. The modulate light beams have different diffraction angles and angular offsets in order to interleave the modulated light beams as described above with reference to FIGS. 8 and 12. In block 1304, the coupled-out light beams are modulated at light valves of the plurality of sets of light valves of the multiview pixel according to assigned pixel intensities as described above with reference to FIG. 12. The interleaved and modulated light beams are directional pixels that correspond to different views of the multiview image.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

The invention claimed is:
1. A multiview display comprising:
a multiview pixel having a plurality of sets of light valves; and
a plate light guide having a plurality of multibeam diffraction gratings, each multibeam diffraction grating corresponding to a different set of light valves of the multiview pixel and having a spatial offset with respect to a center of the set of light valves toward a center of the multiview pixel, wherein the plurality of spatially offset multibeam diffraction gratings are configured to diffractively couple out light from the plate light guide having different diffraction angles and an angular offset with respect to centers of corresponding sets of light valves such that the sets of light valves provide modulated light beams that interleave to produce directional views of a multiview image at a viewing distance of the multiview display.

2. The multiview display of claim 1, wherein the plurality of multibeam diffraction gratings comprises chirped multibeam diffraction gratings formed in a surface of the plate light guide.

3. The multiview display of claim 2, wherein the chirped multibeam diffraction gratings comprise linearly chirped multibeam diffraction gratings.

4. The multiview display of claim 2, wherein the chirped multibeam diffraction gratings comprise non-linearly chirped multibeam diffraction gratings.

5. The multiview display of claim 1, wherein a size of the multibeam diffraction grating is larger than a size of light valve.

6. The multiview display of claim 1, wherein the spatial offset with respect to the center of the set of light valves comprises a distance equal to a fraction of a size of a light valve.

7. The multiview display of claim 1, wherein the multibeam diffraction gratings comprise transmission mode multibeam diffraction gratings.

8. The multiview display of claim 1, wherein the multibeam diffraction gratings comprise reflection mode multibeam diffraction gratings.

9. A multiview display comprising:
  a screen having a plurality of multiview pixels, each multiview pixel having a plurality of sets of light valves; and
  a backlight having a plurality of multibeam diffraction gratings, each multibeam diffraction grating corresponding to a set of light valves and having a spatial offset with respect to a center of the set of light valves toward a center of a multiview pixel,
  wherein the plurality of spatially offset multibeam diffraction gratings are configured to diffractively couple out light from the backlight having different diffraction angles and angular offsets such that the sets of light valves produce modulated light beams that interleave to produce directional views of a multiview image at a viewing distance of the multiview display.

10. The multiview display of claim 9, wherein the backlight comprises:
  a plate light guide having the plurality of multibeam diffraction gratings formed at a surface of the plate light guide; and
  a light source coupled to an edge of the plate light guide, the light source to generate light coupled into the plate light guide,
  wherein a portion of the coupled-in light is diffractively coupled out of the plate light guide by the multibeam diffraction gratings.

11. The multiview display of claim 9, wherein the plurality of multibeam diffraction gratings comprises chirped multibeam diffraction gratings formed in a surface of a plate light guide.

12. The multiview display of claim 9, wherein the spatial offset with respect to the center of the set of light valves comprises a distance equal to a fraction of a length of a light valve.

13. A method to display a multiview image, the method comprising:
  optically coupling light generated by a light source into a plate light guide;
  assigning pixel intensities of a series of two-dimensional (2D) images of the multiview image to light valves of a plurality of sets of light valves of a multiview pixel;
  diffractively coupling out a portion of the light from a plurality of multibeam diffraction gratings of the plate light guide, each multibeam diffraction grating corresponding to a set of light valves and having a spatial offset with respect to a center of the set of light valves toward a center of a multiview pixel; and
  modulating the diffractively coupled-out light portion using light valves of the plurality of sets of light valves of the multiview pixel according to assigned pixel intensities, wherein modulated light beams emerging from the light valves interleave to produce directional views of the multiview image at a viewing distance from sets of light valves.

14. The method of claim 13, wherein assigning the pixel intensities of the series of 2D images of the multiview image comprises:
  assigning pixels of the 2D images with a corresponding pixel coordinate to the multiview pixel; and
  assigning pixel intensities of the pixels with the corresponding pixel coordinates in consecutive 2D images in alternating order to light valves of the plurality of sets of light valves of the multiview pixel.

15. The method of claim 13, wherein each 2D image of the series of 2D images is of a different view of one or more three-dimensional (3D) objects or a 3D scene.

* * * * *